Dec. 24, 1940.  W. W. STUART  2,226,081
FLOW CONTROL SYSTEM
Filed Jan. 5, 1937  3 Sheets—Sheet 1
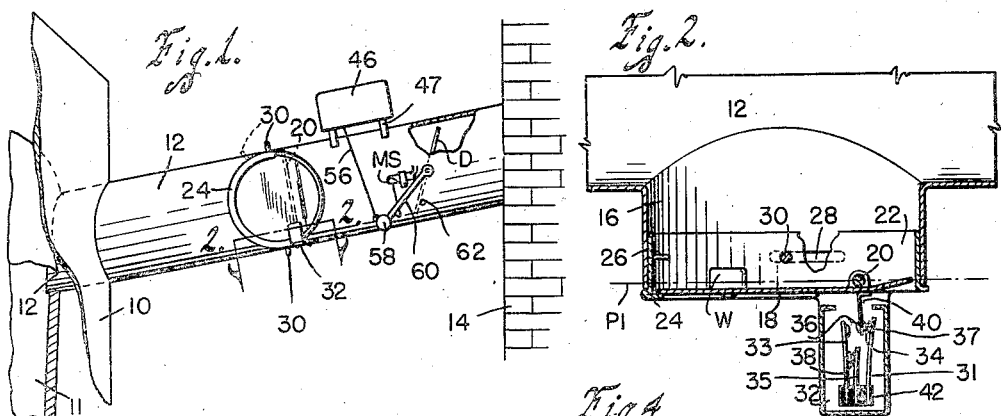
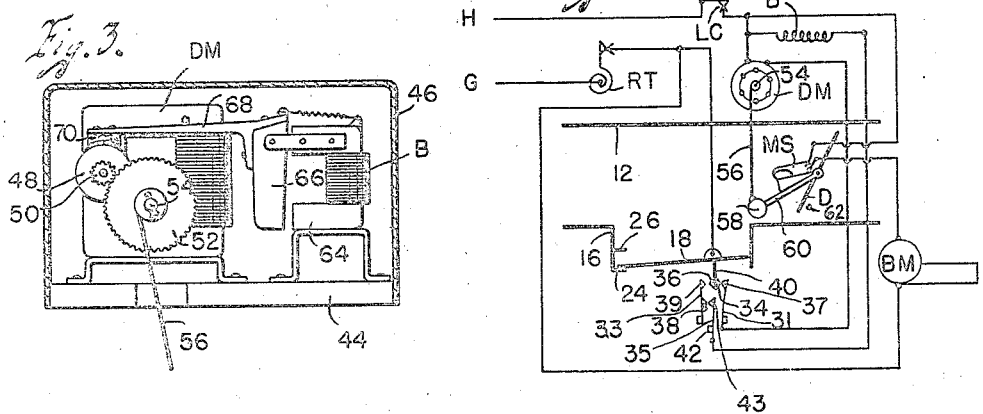
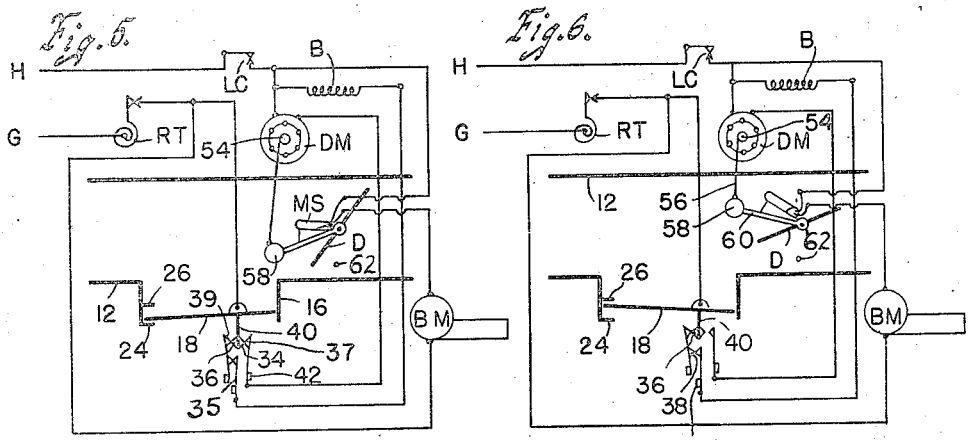
Witness
H. S. Munzenmaier
Inventor
William W. Stuart
By Bair, Freeman & Sinclair
Attorneys Dec. 24, 1940. W. W. STUART 2,226,081
FLOW CONTROL SYSTEM
Filed Jan. 5, 1937 3 Sheets-Sheet 2
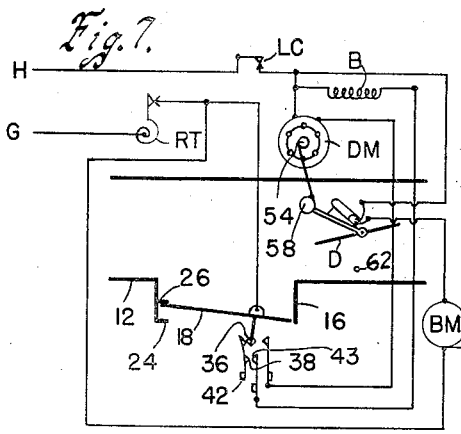
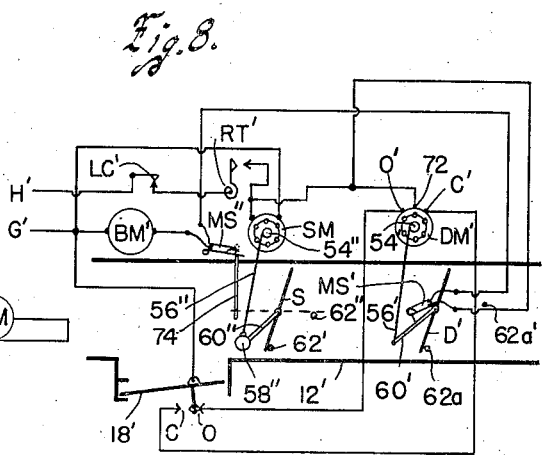
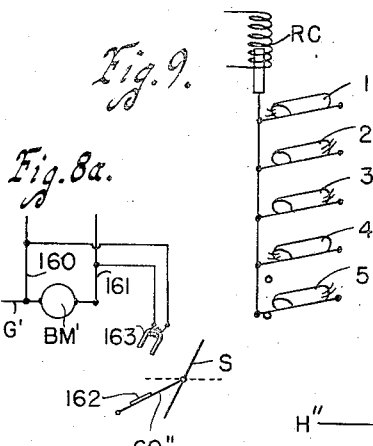
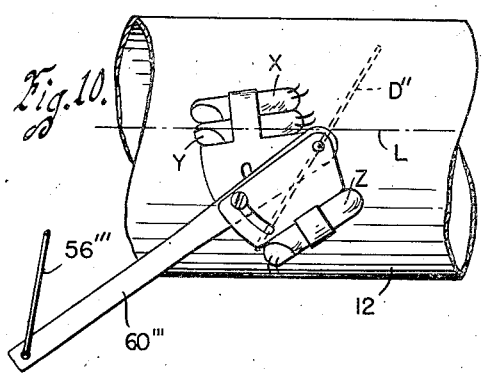
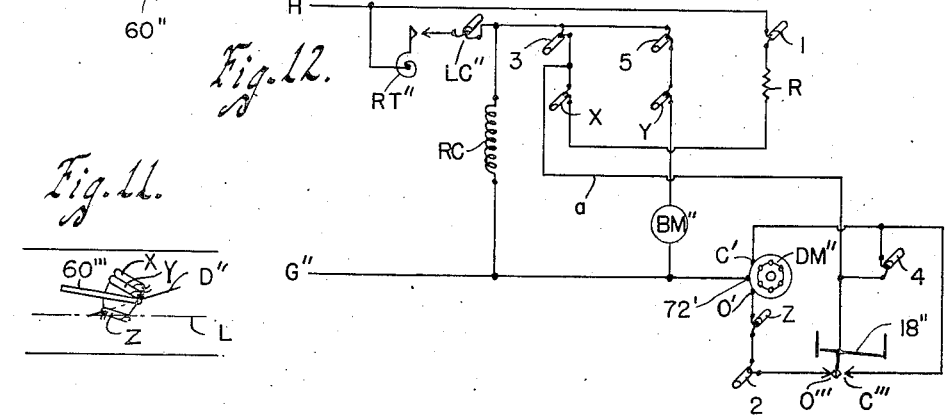
Inventor
William W. Stuart
by Bair, Freeman & Sinclair
Attorneys
Witness
H. S. Munzenmaier Dec. 24, 1940. W. W. STUART 2,226,081
FLOW CONTROL SYSTEM
Filed Jan. 5, 1937 3 Sheets-Sheet 3
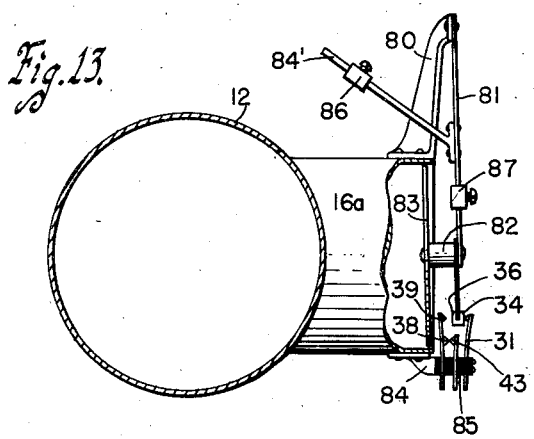
Fig. 13.
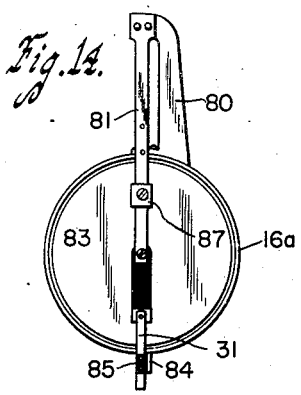
Fig. 14.
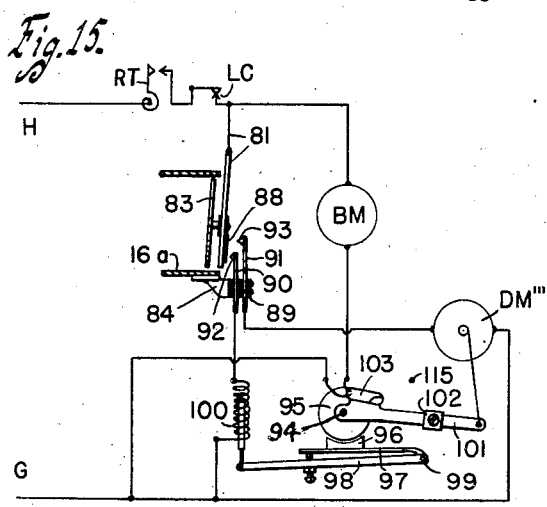
Fig. 15.
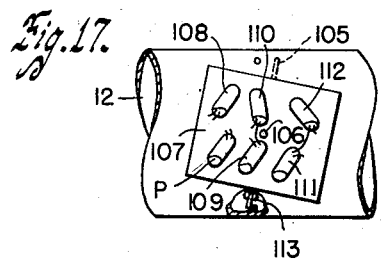
Fig. 17.
Fig. 18.
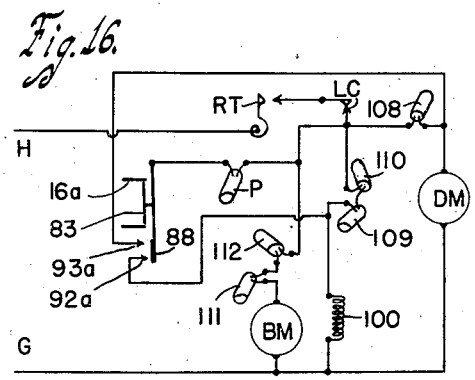
Fig. 16.
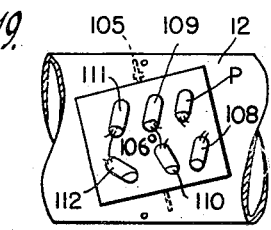
Fig. 19.
Inventor
William W. Stuart
by Bair, Freeman & Sinclair
Attorneys
Witness
H. S. Munzenmaier Patented Dec. 24, 1940

2,226,081

UNITED STATES PATENT OFFICE 2,226,081

FLOW CONTROL SYSTEM

William W. Stuart, Des Moines, Iowa

Application January 5, 1937, Serial No. 119,100

7 Claims. (Cl. 236—1)

One object of my invention is to provide a flow control system, whereby, for example, the draft on a furnace is automatically regulated during operation of the furnace and the volume of air moving through combustion gas passages of the furnace is reduced to a minimum during the stand-by period to conserve heat.

A further object is to provide a draft regulator in the form of a damper or the like in a combustion gas passageway and to electrically control the positioning thereof in accordance with actual draft conditions.

Another object is to provide in combination with a damper in a duct or smoke pipe, a control switch responsive to the pressure in the duct, and arranged to control electric means which in turn positions the damper.

A further object is to provide a simple arrangement of electric motor for opening a damper or valve, and a brake or other suitable means to hold the damper at any opened position, the motor and brake being controlled in accordance with pressure or temperature or other condition.

Another object is to provide a modified construction in which a reversible motor when energized to rotate in one direction, will open a damper, and when energized to rotate in the opposite direction will close a damper, the motor being controlled by a switch actuated by a pressure sensitive device, the motor being operated at line voltage.

Another object is to provide in a heating system, automatic draft regulation involving the positioning of a damper, coordinated with the control of the burner motor so that the furnace is not operated except after the damper has been opened sufficiently.

Another object is to provide such equipment of such sensitivity as to make it applicable to domestic heating installations.

Another object is to provide equipment in which advantage may be taken of the greater simplicity of electrical apparatus that is "line voltage" throughout.

Still another purpose is to provide a simple and efficient pressure sensitive control, faster in its action than the conventional controls that use restricted pipe or tube connections.

It is also my purpose to provide a form of control structure in which a flow control damper is arranged to swing beyond wide open position, to permit starting the burner with damper wide open, and to provide a longer purging period and other advantages.

A further object is to provide equipment to achieve the above-mentioned desirable results, at a cost within the range of the average householder to whom price is an important object.

Another object is to provide such a mechanism which can be readily adapted for static pressure control in air conditioning. In this same field, this equipment, manually or automatically controlled, can be used to position volume dampers in ducts.

A further purpose is to provide a control mechanism which readily lends itself to use with suitable condition sensitive devices for operating mixing dampers or valves.

With these and other objects in view, my invention consists in the construction, arrangement and combination of the various parts of my control system, whereby the objects contemplated are attained, as hereinafter more fully set forth, pointed out in my claims, and illustrated in the accompanying drawings, in which:

Figure 1 is a side elevation of a portion of a heating system showing the smoke pipe and my damper and its controlling mechanism applied thereto, with the damper in closed position.

Figure 2 is an enlarged, sectional view on the line 2—2 of Figure 1 showing a draft sensitive device used for controlling the position of a damper in the smoke pipe of the heating system.

Figure 3 is a vertical, sectional view through a damper actuator for controlling the positioning of a damper in the smoke pipe.

Figures 4, 5, 6 and 7 are electro-diagrammatic views showing different positions of the mechanism of my heating system during operation.

Figure 8 is a similar electro-diagrammatic view of a modified form of construction in which a reversible motor controls one damper for regulating draft and another motor controls a "stopper" damper in the smoke pipe.

Figure 8a is a similar view of a modification of the structure of Figure 8, for installations where the burner motor is caused to overrun.

Figure 9 is a diagrammatic view of a relay having five mercury switches and used in still another modified form of my control system.

Figure 10 is a side elevation of a portion of a smoke pipe with a damper therein and mercury tube switches controlled by the position of the damper for the modified form of control system with which the relay of Figure 9 is used.

Figure 11 is a diagrammatic view showing the parts of Figure 10 in an open damper position.

Figure 12 is an electro-diagrammatic view of the circuit for the modified form of control system to which Figures 9, 10 and 11 are applicable.

Figure 13 is a sectional view of a smoke pipe and sleeve illustrating a particular mode of mounting the pressure sensitive disc, parts being broken away and parts being shown in section, the contact arrangement being that adapted for use with an electric control mechanism, such as is shown in Figure 4.

Figure 14 is an elevation of the disc shown in Figure 13.

Figure 15 is an electro-diagrammatic view, illustrating a slightly different form of control in which the brake is of insufficient power to stall the motor but of sufficient power to hold the damper in any position in which a de-energized damper motor may leave it.

Figure 16 is an electro-diagrammatic view illustrating a modification of my flow control system in which the damper swings from one closed position to a wide open position and on through toward the second closed position starting the burner motor when it is wide open.

Figure 17 is a side elevation of a smoke pipe with the mercury switches on the damper shaft in their positions during stand-by periods.

Figure 18 is a similar view illustrating the switch positions when the damper is in wide open position; and Figure 19 is a similar view illustrating the positions of the switches when the damper is in its other closed position.

Figures 1 to 7

On the accompanying drawings, I have used the reference numeral 10 to indicate the casing of a warm air furnace, the combustion chamber of which is indicated at 11. A passageway for combustion gases such as a smoke pipe 12 extends therefrom as to a chimney 14. By the term "smoke pipe," I mean any conduit for conducting products of combustion.

The smoke pipe 12 is provided with a lateral sleeve 16 in which is positioned a draft or pressure sensitive disc 18. This disc is made sensitive to the draft by pivoting it on a rod 20 which is carried by a sleeve 22 telescoped into the sleeve 16 and rotatable relative thereto. The rod 20 (Figures 1 and 2) is arranged at a slight angle to the vertical and is off-center relative to the disc 18 so that by attaching a weight W to the major portion of the disc the center of gravity of the weight will tend to assume a position in a vertical plane passing through the axis of the rod 20. This plane is indicated by the dotted line Pl in Figure 2.

The center of the weight W in Figure 2, it will be noted, is above this line and therefore tends to swing the disc 18 counter-clockwise to a position contacting with an outer stop 24. A draft in the smoke pipe 12 will decrease the pressure against the inside of the disc 18 so that the pressure within the furnace room, outside the disc, acting on both the major portion of the disc to the left of the rod 20 and the minor portion of the disc to the right of the rod 20, will swing the disc clockwise, depending on the relative difference in pressure.

The draft sensitive disc 18 thereupon assumes any position shown in Figures 5, 6 or 7, Figure 7 being the maximum draft position and the disc's movement being limited by an inner stop 26. Thus the disc 18 responds to a reduction or increase in the pressure of combustion gases in the smoke pipe 12.

The sleeve 16 is slotted as indicated at 28 in Figure 2 so that a rod 30 extending through both the sleeves 16 and 22 will permit relative rotation, for instance to the dotted position of the rod 30 in Figure 1, whereupon it requires a greater degree of draft to swing the disc 18 from its "no draft" position of Figure 2. This, of course, is for adjusting purposes so that the degree of draft can be varied. This draft sensitive disc structure is commonly known in this field.

I will now describe one form of my pilot switch. A leaf spring arm 40 is carried by and moves with the disc 18. On its opposite faces are contacts 34 and 36. Near the spring 40, a support 32 projects from and is fixed to the sleeve 22. On the support 32 is a block of insulation 42 from which project the spring arms 31 and 33 and the shorter spring arm 35 between them. On the arm 31 is a contact 37 which coacts with the contact 34. On the arm 33 is the contact 39 which coacts similarly with the contact 36. The arm 33 also carries the contact 38 to coact with contact 43 on arm 35.

Thus the disc 18 operates the pilot switch in accordance with variations in the draft within the smoke pipe 12 for controlling purposes as will be hereinafter described.

The switching mechanism of the pilot switch described, actuated by a temperature or other condition sensitive element, instead of by the pressure sensitive element here illustrated, may be used to control a damper or valve motor and holding means, such as here illustrated, for operating mixing dampers or valves.

I provide a base 44 (see Figure 3) suitably mounted in a stationary manner as by brackets 47 (see Figure 1) secured to the smoke pipe 12, which houses a damper motor DM and a brake mechanism, the actuating coil of which is indicated by the reference character B. A casing 46 encloses the damper motor and the brake mechanism. The damper motor has a brake drum 48 and a pinion 50 secured to the shaft thereof. The pinion 50 meshes with a gear 52 having a drum 54. A flexible element 56 is adapted to be wound on the drum 54 and extends downwardly and is connected with a damper arm weight 58. The weight 58 is secured to a damper arm 60 which in turn is secured to the shaft of a damper D in the smoke pipe 12. The damper D constitutes a movable element for flow restricting or permitting purposes for the combustion gases through the passageway or pipe 12.

A stop 62 is provided for the damper in its nearly closed position, the position of this stop being such that a slight draft is permitted to prevent any furnace gases escaping through the sleeve 22 around the edge of the disc 18, but the damper is closed sufficiently to hold to a minimum the escape of residual heat from the chamber 11 to the chimney 14. This stop is preferably adjustable but for purposes of simplicity is shown in the drawings as fixed. The damper reduces loss of heat up the chimney and permits such heat to be utilized for warming the building, thus delaying the succeeding burner operation and thereby effecting an economy in fuel consumption.

The brake coil B is wound on a core 64, which, upon being magnetized by energization of the coil B, attracts an armature 66. The brake arm 68 is connected with the armature 66 and is provided with a brake shoe 70 for contacting with the drum 48, whereupon the motor can not rotate even though energized, as the braking power is sufficient to stall the motor.

Mounted on the damper arm 60 (see Figure 1) is a mercury tube switch MS for controlling a burner motor BM (see Fig. 4). The foregoing parts are connected in an electric circuit, as illustrated in Figure 4, in which H and G are hot and ground supply wires, respectively. RT is a condition sensitive element or control switch, such as a room thermostat. LC is limit control of the usual type responsive to the bonnet temperature of a warm air furnace or to water temperature of a hot water boiler or pressure of a steam or vapor system.

Figure 8

In Figure 8, I show a modified construction in which two dampers are used, and instead of providing a brake for stalling the motor of the second damper D', the arm 60' of the damper D' is connected with a damper motor DM' of the reversing type (in this case—stallable) by the flexible element 56'. The motor DM' whenever de-energized, will remain in the position in which it stops, slight frictional means being provided for this purpose if the gear train or other drive does not hold it. The arm 60' is of sufficient weight to close the damper D' when the motor DM' slacks off on the flexible element 56'.

The motor is controlled by a draft sensitive disc 18' and a pilot switch which differs from the pilot switch of Figure 2 in that there are only two sets of contacts O and C used for controlling the opening or closing respectively of the damper D' by the motor DM'. This motor has a common terminal 72 and a pair of terminals O' and C' for controlling the motor DM' so that when the circuit is established across the terminals O' and 72, the damper D' will be opened and when the circuit is established across the terminals C' and 72, the damper D' will be closed.

With such an arrangement, it is possible for the damper D' to stop in any position when the heating system is shut down, instead of returning to closed position. I therefore provide in the smoke pipe 12' a second damper S, which I term a stopper damper. This damper is actuated by a damper arm 60" and a stopper motor SM, the motor being provided with a drum 54" and a flexible element 56" wound thereon and connected with the weight 58" on the arm 60".

A stop 62' is provided for the stopper damper S in its closed position. 62a is a stop for the damper D' to limit its closing, and 62a' is a stop limiting its opening.

If a non-stallable motor is used, switches operable with the shaft of the damper D' are used in place of the stops 62a and 62a'. These switches limit the movement of the damper D', one switch in series with C and C' and another in series with O and O'. An illustrative embodiment of such an arrangement of switches operable with the damper shaft is shown in Figures 10, 11 and 12.

The motor SM when energized opens the damper S, which in approaching open position raises a rod 74 which closes a motor switch MS" in series with the motor switch MS' on the shaft of the damper D'. A mercury switch may be mounted on the shaft of the damper S and connected in series with switches MS' and MS" to open the burner motor circuit when damper S closely approaches its closed position to stop the burner motor in case MS" should stick or be blocked in its closed position.

This stopper damper S is disclosed in my Patent No. 2,067,426 issued January 12, 1937, although not in combination with an automatic draft regulator, as herein disclosed.

When the switch MS" is in closed position, the damper S engages an open position stop 62", thus stalling the motor SM so that the damper S will remain open as long as the motor SM is energized, but will coast back to closed position whenever it is de-energized.

Figure 8a

Figure 8a shows a part of the structure of Figure 8, with current wires 160—161 leading to the burner motor, for allowing an overrun when RT' is satisfied. 161 is an armature on the arm 60" and 163 is an electro magnet energized from 160—161, to hold the damper S open during the overrun period, as referred to below.

Figures 9 to 12

In Figures 9, 10, 11 and 12, I show an arrangement in which a relay shown in Figure 9 and provided with mercury tube switches 1, 2, 3, 4 and 5 can be utilized in place of the motor SM and the stopper damper S of Figure 8 to accomplish the same results as far as the control of the draft is concerned, it being expedient to provide control switches on the damper arm 60'" for this purpose. These switches bear the reference characters X, Y and Z.

The switches 1 and 4 of the relay are normally closed while the switches 2, 3 and 5 are normally open. Whenever the relay assumes a reversed position because of being energized, the switches 1 and 4 are thereby opened and the switches 2, 3 and 5 are thereby closed.

The damper D" is shown in closed position in Figure 10 and in open position in Figure 11.

Immediately after leaving closed position, the switches X and Y, which are normally open, will close, while the switch Z, which is normally closed, will not open until the position of Figure 11 is reached. The switches 1, 2, 3, 4 and 5 and X, Y, and Z are connected with the relay coil RC, a room thermostat RT", a limit control LC", the hot and ground line wires H" and G", a burner motor BM", a reversing type damper motor DM" and a pilot switch similar to the one shown in Figure 8 and having two sets of contacts O'" and C'".

The opening and closing terminals of the motor DM" are indicated at O' and C' respectively.

Figures 13 to 15

In Figure 13, I have shown a different and preferred form of pressure sensitive device, which can be used with any of the switch structures operated by pressure sensitive devices of Figures 1, 2, 4 to 8 and 12. I have provided a sleeve 16a, on which is a bracket 80, from which is hung a flat spring 81.

A supporting bracket or arm 82 extends from the spring 81 and supports a disc 83 in such manner that the disc 83 substantially closes but travels freely in the sleeve 16a, moving toward and from the smoke pipe 12, and being directly and immediately responsive to pressure changes in the smoke pipe.

The length and cross sectional area of the sleeve 16a are such as to insure the transmission of pressure changes occurring in the pipe 12 to the disc 83 without substantial lag.

The mode of mounting the disc 83 is such as to permit its movement responsive to such pressure changes with a minimum of resistance. The movement is only that which is necessary for actuating the associated switch mechanism referred to below.

The disc may be mounted in the wall of the pipe 12 without the intervening sleeve 16a—becoming a movable portion of the wall of the pipe 12.

Mounted thus, the disc is not subject to the lag that results when restricted passageways are used. I have shown the disc as round, but it can be of other shapes, and when a part of the wall of a round pipe like 12 may conform to the curve of the pipe wall.

It will be observed that with the present mode of mounting the disc 83, the entire area of the disc is usefully effective in operating the switch. This is not true of a disc pivoted at two points in its periphery as illustrated in Figure 2.

On the sleeve 16a is a support 84 for a block of insulation 85, which is part of a switch mechanism similar to that disclosed in Figure 2.

To afford simple and effective means for changing the draft maintained, I mount an adjustable weight 86 on a bar 84' supported by the spring 81. For regulating the speed of response of the disc to pressure changes, where it is desired to dampen out rapid pulsations or fluttering, I may mount on the spring 81 an adjustable inertia weight 87, which may be raised and lowered on the spring. Any effect the adjusting of this weight may have on the pressure maintained may be offset by a readjustment of the weight 86.

The switch mechanism shown in Figure 13 is intended to be electrically connected with the other parts in the same way as is the switch mechanism shown in Figure 4.

In Figure 15 is illustrated a different type of brake mechanism and control intended to be associated with the disc 83 hung on the spring 81 or other suitable support.

The disc mechanism carries a contact bar 88. On the sleeve 16a is a bracket 84 similar to that already described, carrying a block of insulation 89, which has the two projecting spring contact arms 90 and 91 with the contacts 92 and 93 thereon arranged to coact with the contact bar 88. The contacts 92 and 93 are so arranged that 92 makes contact first upon outward swinging movement of the disc 83.

I have shown a damper shaft 94, which it will be understood is connected with the damper in the smoke pipe. On the damper shaft is a brake drum 95. For coacting with the brake drum 95 is a brake shoe 96 supported by means of an adjustable spring 97 on an arm 98 pivoted at one end as at 99. The other end of the arm 98 is connected with the armature of a solenoid 100.

Parts are provided so that a circuit may be completed from the wire H through the room thermostat RT, limit control LC, conductor 81, bar 88, contact 92, spring arm 90, solenoid 100 to G.

On the shaft 94 is an arm 101 on which is a weight 102, which is preferably adjustable to compensate for installation of the smoke pipe at different angles and for otherwise facilitating installation and adjustment of the system.

The arm 101 is operatively connected with a damper motor DM''' just as is the arm 60 with the damper motor DM (Figure 4).

With no draft in the fire box, the contacts 88—92 and 88—93 are normally closed.

Figures 16 to 19

In Figures 16 to 19, I have shown another form in which my invention may be embodied. In this form, the operation of the damper is different from anything heretofore practiced in that the damper moves from a first closed position to wide open position, where the burner motor is started, and on in the same direction through a regulating range toward the second closed position. An elongated damper will accomplish these results moving through a smaller arc, as for example, an elliptical damper in a round pipe.

In the form of device now under consideration, the damper 105 is mounted in a smoke pipe 12, such as has already been described, with a sleeve 16a, and disc 83 such as those shown in Figure 13, and a burner motor BM similar to that of Figure 4, and a damper motor DM, such as that of Figure 4, and a solenoid 100 for controlling a brake mechanism, such as that shown in Figure 15.

On the damper shaft 106 is a plate 107 on which are mounted mercury switches as follows:

Damper motor starting switch 108, pilot control switch P, brake circuit switches 109 and 110 connected in series with each other and with the brake circuit, and burner motor switches 111 and 112 connected in series with each other and with the burner motor.

In Figures 16 and 17, I have shown the parts in their positions when the damper is closed in stand-by position.

Figure 18 shows the switches in their positions assumed when the damper reaches wide open position, and Figure 19 shows the switches in the positions assumed when the damper reaches its second closed position.

The damper is normally constrained toward first closed position by means of the weight 113.

The circuit arrangements of the switches of Figures 16 to 19 will be more fully referred to in the description of the practical operation of the form of my device here disclosed.

Definitions

By "stopper," I mean means for closing the duct or smoke pipe during stand-by periods.

By "burner" as used in this application, I mean to include any combustion means such as oil or gas burners or stokers which may be automatically controlled.

Where combustion is not stopped, as in the case of a stoker, the damper may be stopped a little farther from fully closed position for stand-by periods.

I use "satisfied" as applied to the draft sensitive device to indicate that condition or position of the device when the draft is that desired.

By pilot switch, I mean the draft sensitive disc and its associated switching mechanism, one form of which is shown in Figure 13.

By "line voltage" throughout, I mean that the system is operated at the voltage of the current supply without any step down transformer.

By "holding means," I would include any means other than the motor and drive for holding the damper when the pilot switch is satisfied.

PRACTICAL OPERATION

Figures 1 to 7

When the heating system is shut down, due to the room thermostat RT or limit control LC being satisfied, the damper D assumes the position shown in Figure 1 against the stop 62. It will be noted that the motor switch MS is in open circuit position.

When the room thermostat calls for heat, as in Figure 4, the damper motor DM will be energized from H through LC, the damper motor DM, 31, 37, 34, 40 and RT to G. This will cause the damper motor to wind the flexible element 56 on the drum 54 to move the damper away from the stop 62 and toward open position.

The draft sensitive disc 18 is initially in the position illustrated in Figure 4, thus positioning the damper opening contacts 34 and 37 in their closed position.

As the damper opens further, the motor switch MS will close for energizing the burner motor from H through LC, MS and the burner motor BM, RT to G. After this occurs, the draft increases so that the disc 18 will assume the position illustrated in Figure 5, where all contacts are closed. This establishes an additional circuit from H through LC, brake coil B, 35, contacts 43 and 38, 33, contacts 39 and 36, 40 RT to G, and the brake stalls the damper motor. In this position, the pilot switch is satisfied, since the desired draft has been established.

If at this point, there is a decrease in draft, the disc 18 will move toward the stop 24 and the brake will be released, and the DM will be permitted to open the damper further to increase the draft.

(The pilot switch structure here shown may be used with a motor and brake that has not sufficient power to stall the motor but slows it down. The brake will hold the damper stationary when applied with the motor de-energized.

With such an arrangement, the brake is applied as the desired draft is approached and the motor is slowed down and yet permitted to continue in motion, so that the damper D creeps into the position that satisfies the pilot switch (illustrated in Figure 6) and de-energizes the motor DM. This permits use of a damper motor of higher speed and yet provides the advantage of a slower moving pilot switch for avoiding fluttering.

This permits the damper D to "hurry" through the earlier part of its travel and to slow down in its final movement to satisfied position, thereby minimizing the tendency to "hunt.")

The establishment of combustion increases the draft, so the disc 18 moves into the position shown in Figure 6 and breaks the damper motor circuit. The distance the disc 18 moves in passing between the positions shown in Figures 5 and 6 is so small that the pilot switch is considered satisfied in both positions.

Any further increase in the draft will cause the contacts 38 and 43 to be opened as in Figure 7, thus opening the circuit of the brake coil B, whereupon the damper motor DM will be rotated reversely by the weight 58 for closing the damper to decrease the draft. While this equipment is in operation as a draft control, the disc 18 and the contacts of the pilot switch will play through the positions shown in Figures 4, 5, 6 and 7, as long as both the room thermostat and the limit control contacts are closed. The position of the damper D is automatically varied for securing a substantially constant draft. In the positions shown in Figures 5 and 6, the damper will remain fixed, (assuming the use of a motor stalling brake).

On a calm day, the damper D will quickly find its proper position and remain there for a substantial length of time, while on a windy day when the draft varies, there is more movement of the damper.

When the room thermostat or the limit control opens, the circuit to the pilot switch is broken so that current can no longer be supplied to either the brake coil B or the damper motor DM. The damper will then coast back to the closed position of Figure 1.

When the damper strikes the stop 62, the smoke pipe is sufficiently closed to retain most of the heat of the heating plant within the furnace itself for distribution to the rooms being heated, so that very little heat is wasted.

Compared with the usual type of check or draft control in the smoke pipe or chimney, this is a decided improvement as such checks pass basement air to the chimney and this air can only be replaced by cold outside air coming in through cracks or other openings.

It is observed that a satisfied limit control as well as a satisfied thermostat will result in the closing of the damper D.

*Figure 8*

In Figure 8, a reversing type of motor DM' is used which will open or close the damper D', depending on the direction of rotation of the motor shaft, and whenever this motor is de-energized, the damper D' will stop moving, regardless of what position it is in.

In the operation of the system shown in Figure 8, the closing of the damper opening contacts or of the damper closing contacts, will close a circuit for rotating the motor DM' either in one direction or the other. An intermediate position of the draft responsive disc 18', however, leaves both sets of contacts O and C open. The damper motor DM' can operate, however, only when the room thermostat RT' and the limit control LC' are in closed circuit position. The stopper damper motor SM is energized whenever both the room thermostat and the limit control are in closed circuit position. Both being energized, the motor SM opens the stopper damper S which closes the motor switch MS'' for energizing the motor BM'.

However, the switch MS' is in series with the switch MS'' so that both of these switches must be closed before the burner motor can operate.

As heretofore mentioned, it would be advisable to put an additional switch on the stopper damper shaft in series with switches MS' and MS''. This would open the burner motor circuit when the stopper damper approached closed position even though switch MS'' should be stuck or blocked in its closed position. Such a structure is illustrated in my Patent No. 2,067,426.

The motor switch MS' will be closed at all times except when the damper D' closely approaches closed position. MS' may remain closed during the standby period of the burner, but no circuit is closed through MS', so long as either RT' or LC' or MS'' is open. The opening of RT' or LC' opens MS''.

Thus the burner motor is so controlled that the damper D' must be moved away from its closed position and the stopper damper S must be wide open before the burner can operate.

The stopper damper S may be of more rugged construction and is placed closer to the fire than the damper D' thus affording a degree of protection to the more delicate mechanism associated with the regulator damper.

The pilot switch with its disc 18' is shown located between the stopper damper S and the burner, but it might be placed between the dampers S and D'. The position illustrated is usually preferable.

*Modification for overrunning motors*

Controls used with some "rotary" or "spinner" burners provide for a motor "over-run." With such controls, the fire is put out upon the satisfying of the thermostat, but the motor is permitted to run until the spray plate or atomizer is dry.

The form shown in Figure 8 can be used on such an installation by merely adding an electro holding magnet 163 (Figure 8a) to keep the damper S in the wide open position even after the motor SM has been de-energized. This can be done by placing an armature 162 on the arm 60'' and a coil in position to coact therewith when the damper S is open. The winding of this magnet 163 is connected in parallel with the burner motor, so that the magnet is energized, as long as the burner motor is energized, and thus the smoke pipe is not closed until the burner motor has completed its "overrun."

Figures 9 to 12

In the operation of the system shown in Figures 9 to 12, the room thermostat RT'' upon closing, will energize the relay coil RC. This tips all the switches 1, 2, 3, 4 and 5 to the opposite position from that shown in Figures 9 and 12. A circuit is then established from H'' through RT'', LC'', 3, wire a, opening contacts O''', 2, Z, terminal O', then through the damper motor DM'' and 72' to G''. This opens the damper and soon after it leaves the closed position, the switches X and Y are closed. Closing of the switch Y causes the burner motor BM'' to operate, its circuit being traceable from H'' through RT'', LC'', 5, Y, BM'' to G''. Closing the switch X does not produce any result since the switch 1, in series with it, is in open circuit position.

As the draft increases, the disc 18'' will cause the contacts O''' to open, while a further increase will close contacts C'''. Upon closing of these contacts, the damper motor DM'' will be energized for moving the damper toward closed position.

During operation of the burner, the contacts O''' and C''' will be engaged upon variation in draft, thereby adjusting the damper to the proper position for the required draft.

When either the room thermostat or the limit control is opened, the switches 1, 2, 3, 4 and 5 assume the position shown in Figure 12, whereupon a circuit is established from H'' through 1, a resistance R, X, a, 4, C', DM'', 72' to G'' for causing the damper D to return toward its closed position. Return will be slowed down by the resistance R as it is desirable to have relatively slow closing thereof for best results in purging.

As soon as the circuit is opened through the switch X, which is just prior to the closed position of the damper in Figure 10, the damper motor will be de-energized, and the damper will stop in this position.

As to the purposes of each of the switches, it will be noted that the switch 1 establishes a shunt circuit around the room thermostat and the limit control in order to close the damper when either the room thermostat or the limit control opens. The switch X limits the movement of the damper toward its closed position.

The switch 2 establishes a damper opening circuit through the damper motor after the room thermostat closes, which circuit is also traceable through the switches Z and 3.

The switch Z limits the opening of the damper, because when the position of Figure 11 is reached, this switch is tipped to its open position.

The switch 3 energizes the damper motor when the room thermostat closes and places the damper motor in control of the draft responsive disc 18''. Switch 3 primarily serves to prevent the completion of a circuit through RC after RT'' or LC'' has opened.

The switch 4 upon opening of the room thermostat is closed for the purpose of establishing a circuit shunting the closing contacts C''' of the damper motor, and thus operating in conjunction with the switches X and 1 for damper closing purposes whenever the room thermostat or the limit control is satisfied.

The switch 5 is in control of the burner motor for the purpose of de-energizing it whenever the relay coil is de-energized, thus de-energizing the burner motor at the time the room thermostat is satisfied, while the switch Y in series therewith, serves to delay starting of the burner motor until after the damper has been partly opened. The switch Y is therefore the starting switch for the burner motor and the switch 5 is an additional safety switch.

The switch Y will also serve to stop the burner motor, if the damper should too closely approach its closed position, through some failure of the damper motor or the pilot switch.

Figures 13 to 15.

The operation of the structure shown in Figures 13 and 14 is the same as that shown in Figure 2 so far as the functioning of the switch structure is concerned.

In Figure 15, I have shown what for convenience I may call a second brake arrangement. In this form, there is illustrated a brake of the type that does not stall the motor and that is applied to the damper shaft. This brake has been previously described. I will now describe its operation.

If the room thermostat RT calls for heat and the limit control is closed and the disc 83 is in a position calling for an increase in draft, then the contact bar 88 and the contacts 92 and 93 are engaged, and a circuit will be closed from H through RT, LC, 81, 88, 92, 90, 100 to G.

The energizing of the brake coil will put on the brake. A circuit will also then be closed from H through RT, LC, 81, 88, 93, 91, DM''' to G.

The energizing of the damper motor will cause it to operate to lift the arm 101 and move the damper toward open position. When the damper is sufficiently opened to permit the operation of the burner, the switch 103 closes and a circuit is closed from H through RT, LC, BM, and 103 to G. The burner operates until the room thermostat or the limit control is satisfied. Whenever the room thermostat or the limit control is satisfied the brake coil 100 and the damper motor DM''' will be de-energized and the weight 102 will move the damper to its closed position.

If at the time when the room thermostat calls for heat, there is little or no draft in the chimney, the operation described above will result in the moving of the damper to its wide open position at which point the motor DM''' will stall, as the stop 115 has been reached.

The operation of the burner will increase the draft and cause the disc 83 to move toward the smoke pipe 12. In its first movement, it will break the circuit closed through contact 93 and bar 88, and the damper motor DM''' will be de-energized. The pilot switch is now satisfied. The brake will hold the damper in this position until a further increase in the draft still further moves the disc 83 toward the smoke pipe 12 and breaks the circuit through the bar 88 and contact 92, de-energizing the brake.

This will permit the weight 102 to move the arm 101 and the damper toward closed position to reduce the draft.

The reduction in draft results in the movement of the disc to the position where the brake is again applied.

In operation, the disc will play through the above described range for positioning the damper to maintain the desired draft during burner operation.

If a non-stallable motor is used, a switch operable with the shaft 94 of the damper is used in place of the stop 115 to limit the opening movement of the damper. This switch would be in series with 91 and DM′″ or DM′‴ and G.

Figures 16 to 19

I will now describe the operation of the particular form of my invention diagrammatically illustrated in Figures 16 to 19.

I will preface the detailed explanation of the circuit closing operations with a general explanation of the functioning of the device.

One of the important features of this form is the starting of the combustion equipment with the smoke pipe wide open. This is accomplished by dividing the operation into two parts. In the first part, the damper is moved from its closed position to a wide open position. The second part of its operation involves the regulation of the draft. The damper moves into this regulating range by moving beyond the wide open position and toward its second closing position. Switching mechanism has been provided to get the damper from its first closed position into the wide open position and at this point, the burner circuit is closed and the pilot switch that controls the draft is put into service. Through this central portion of its movement, a brake is applied to prevent the damper falling from its regulating range to its stand-by position. The application of this brake overlaps the disconnecting of the damper opening circuit and the closing of the circuit to the pilot switch.

When the room thermostat calls for heat, a circuit will be closed, if LC is closed, from H through RT, LC, 108 and DM to G, thus energizing the damper motor for moving the damper 105 from its normally closed position of Figure 17 to its substantially wide open position of Figure 18.

The switches 109—110 are so mounted on the plate 107 that a circuit is closed through them just before the damper reaches its open position of Figure 18, thereby closing a circuit through the solenoid 100 and applying the brake.

During the opening movement of the damper and just after the switch 109 closes, the switch P closes for putting the pilot switch into service.

When the damper reaches wide open position, the switches 111 and 112 are in position for closing a circuit through the burner motor.

The burner starts and draft is created in the pipe 12. Thereafter and in normal operation, the damper after passing wide open position will travel through what may be called its regulating range under the control of the pilot switch, as such control is described in the explanation of the structure shown in Figures 13 to 15, except, however, that the damper is pulled into its draft reducing position by the damper motor and permitted to coast into its draft increasing position. This is accomplished by putting the two stationary contacts 92a and 93a on the opposite side of the contact bar 88 from the location illustrated in Figure 15.

Both the opening and the closing of switches 108 and P and 111 take place while both 109 and 110 are closed or in other words while the brake is applied.

This overlapping of switch operation is to insure passing from the starting range to the regulating range without any gap.

If some abnormal condition should arise that would result in the moving of the damper so far toward its second closing position that it would become inadvisable to continue operation of the burner, the burner will be stopped by the opening of the switch 112.

The position of this switch may be adjustable by any suitable means so that this point may be varied, and this opening takes place some place between the two positions shown in Figures 18 and 19.

It will be noted that though there may be no draft in the chimney when the room thermostat calls for heat, the brake will hold the damper in the wide open position.

Likewise any sudden reduction in the draft that would cause the disc 83 to move away from the smoke pipe 12 opening both the brake circuit and the damper motor circuit through the pilot switch, will permit the damper to move from a point near its second closed position toward its wide open position, where it will be caught and held by the brake, energized through the switches 109 and 110.

It will be held in this position until the room thermostat or limit control is satisfied or until a movement of the disc 83 again closes the circuit through the damper motor.

Upon the satisfying of either the room thermostat or the limit control, both the damper motor and the brake are de-energized, and the weight 113 returns the damper to the position shown in Figure 17.

Among the advantages found in the system here described may be mentioned the following:

There is provided mechanism for controlling the draft during burner operation to aid in maintaining proper combustion with a minimum waste of heat through the stack. This result is accomplished primarily by means of the pilot switch and the damper connected with it and the associated controls.

Likewise by the provision of the stopper feature, heat is conserved in the system when the burner is not operating.

Important among the advantages of my system are the accuracy and sensitiveness of its operation and the economy of installation which makes it available for domestic use.

It will be noted that I have designed electrical equipment, which may be line voltage throughout, where the ruggedness and simplicity of a line voltage arrangement is desired.

It will be noted that on account of the great area of the draft sensitive member 18, 18′, 18″, 83 and its close proximity to the smoke pipe and the large cross sectional area of the passage between it and the smoke pipe, this draft sensitive device responds almost instantly to changes in pressure in the smoke pipe. This instantaneous response of the pressure sensitive member makes possible the use of a faster moving damper with a minimum probability of hunting.

The use of the brake as herein explained still further reduces the tendency to hunt.

The form of device shown in Figure 8 is such that a reversing motor may be employed, and at the same time the advantages of a stopper damper normally constrained to move toward closed position may be retained.

It may be pointed out that with this form it is not necessary to have two dampers immediately adjacent each other as illustrated in Figure 8. They may be widely separated in the system, and yet satisfactorily perform their functions, thus affording a great flexibility in installation.

Figure 8a shows a form of device adapted for installations providing for motor "overrun," and whereby the advantages of the structure of Figure 8 are retained.

The structure shown in Figures 9 to 12 is another form of device in which the advantages of using line voltage throughout controlled by the pilot switch at all times, except when closing the damper at the end of a heating cycle, and of the large area draft sensitive member, are secured.

The advantages of the device shown in Figure 13 have been in part explained. This draft sensitive disc is mounted so as to afford accurate and almost instantaneous response to changes in pressure in the duct. It might be supported from either side or the bottom.

It is very simple in construction yet its operation can be easily regulated by means of the adjustable weights 86 and 87.

There is an advantage in the fact that the member 81 may serve as a conductor as well as a means for suspending the disc 83. The member 81 need not necessarily be a spring, but could be a flexible member.

The disc 83 of Figure 13 will more effectively and rapidly operate its associated switch mechanism than will the commonly known disc 18 of Figure 2, though the disc 18 of Figure 2 is of greater diameter.

It is obvious where a damper controls flow through a duct under the control of a pressure sensitive device, that the damper should be stopped as close as possible to the position in which the desired pressure may find it. This means that the pressure sensitive device must move into its satisfied position in a minimum length of time after the desired pressure in the duct has been established. Likewise any change in pressure from that desired should result in an immediate response on the part of the draft sensitive device. The slower the response of the draft sensitive device to pressure changes, the more probability there is that there will be a lag between pressure changes and damper movement, and the more lag there is, the more tendency there will be on the part of the damper to overrun the desired position and to set up a hunting action.

It is therefore desirable that response of the pressure sensitive device to pressure changes in the duct should be as nearly instantaneous as possible. Pressure sensitive devices heretofore have failed to respond as quickly as is desirable, due to a variety of causes.

Among these is the lag in communication (between the duct and the movable element of the pressure sensitive device) through restricted passageways, perhaps of small area or great length or both.

Another of these causes is the friction of bearings supporting the movable element.

Where the movable element is a diaphragm, there is, of course, resistance to flexing at the edges and there is a varying effectiveness of the diaphragm from center to periphery. This is also true of bellows.

In ordinary cross-hung dampers, part only of the area of the damper is usefully effective. The area on the opposite side of the pivots from the useful area has a detrimental effect.

Such a movable element, to accomplish its purpose, must necessarily be larger than one moving in its entirety in one direction, and this greater area involves a greater mass with greater inertia.

Inverted cups in oil baths respond with varying speeds as changes in temperature change the viscosity of the oil.

If pistons and cylinders were used in place of diaphragms or bellows or inverted cups, the friction of the piston on the cylinder wall would produce a lag.

In all of these forms described, as commonly known and used, connections to the source of pressure are made through long ducts of restricted area.

The disadvantages of all these prior devices are avoided with the form of structure shown in Figure 13, in which the disc 83 is so mounted as to respond with maximum promptness to pressure changes.

The form of the system illustrated in Figures 16 to 19 has numerous advantageous features.

The arrangement insures movement of the damper to full open position before the burner circuit is closed.

When, as is frequently the case, there is little or no draft in the chimney, when the burner starts, it is an advantage to have the damper wide open, where it does not restrict flow.

The initial puff will drive less gas through the fire door or other openings when there is minimum restriction in the combustion gas outlet.

Upon stopping the burner, the closing movement of the damper, in the arrangement now under consideration, affords a longer purging period.

During this purging period, the damper moves from a flow restricting position to wide open position and then toward final closing position, affording for at least an instant the full pull of the available chimney draft.

These advantages are gained with a minimum of operative mechanism and hence at minimum expense. The simplicity of the design makes for reliability in operation.

This same equipment in other forms can be used to control the flow of fluids other than air and gas.

It will be seen from the foregoing description and explanation of the operation of my device that here are general features involved, which may be embodied in different forms of structure, and it is my purpose to cover by my claims any forms of structure and any changes in arrangement which may be fairly within the scope of my invention.

I claim as my invention:

1. In a heating system, a smoke pipe, a damper biased toward closed position for controlling flow through the pipe, a room thermostat, means for opening the damper when the room thermostat calls for heat, a draft sensitive device for then controlling the damper, means for holding the damper when the device is satisfied, and a switch actuated according to damper movement.

2. In a flow control system, a fluid conductor, means for restricting flow through the conductor, normally constrained to move in one direction, a condition sensitive device, a stallable motor to move the means in the other direction, and an electrically controlled holding element for stopping the movement of the flow restricting means and other means actuated by the device to energize the motor and actuate the holding element when the device is satisfied, and means for releasing the holding element upon a change of condition in one direction and for releasing the holding element and de-energizing the motor upon a change of condition in the other direction.

3. In a flow control system, a fluid conductor, means for restricting flow through the conductor, said means being normally constrained to move in one direction, a condition sensitive device, a stallable motor for moving the means in the opposite direction, an electrically controlled holding element for stopping movement of the flow restricting means, and other means actuated by the device for closing a motor circuit and a holding element actuating circuit when the device is satisfied, and for opening the holding element circuit upon a change in condition in one direction and for opening both the motor and holding element circuits upon a change in condition in the other direction.

4. In a flow control system, a fluid conductor, means for restricting flow through the conductor, said means being normally constrained to move in one direction, a condition sensitive device, a stallable motor operatively associated with the means, an electrically actuated holding element for holding said means against movement, and electrical control mechanism including a source of electrical energy, and means for including the motor and holding element in circuit with the source, said device being operatively associated with said electrical control mechanism, and arranged to successively energize the motor when the device is on one side of its satisfied position and to energize the holding element when the device reaches its satisfied position, and upon still further movement of the device in the same direction to a point on the other side of its satisfied position to open the motor circuit and the holding element circuit.

5. In a heating system, a smoke pipe, a damper in the pipe, a draft sensitive device, a damper motor, a holding element for holding the damper, a motor circuit, and a holding element actuating circuit including a switch, means actuated by the device for closing the motor circuit when the device is subject to draft below a given value and for opening the motor circuit when the device is subject to draft above a given value, and for closing the holding element circuit when the device is subject to draft of a given value and for opening the holding element circuit switch when the device reaches a given value above that at which the holding element circuit switch is closed.

6. The combination of a duct with a pressure sensitive device, comprising a disc having one face only subject to pressure in the duct substantially without restriction, said disc being normally impelled to one position movable according to changes in such pressure, and means for supporting the disc free from peripheral connection with any fixed part, for bodily floating movement, and a switch actuated by the disc, a damper in the duct, normally closed, and electrical means including the switch for controlling the damper from the disc when the disc is not in said one position.

7. The combination of a duct and a sleeve communicating therewith, with a disc in the sleeve with its periphery slightly spaced from the wall of the sleeve, and means for mounting the disc for bodily floating movement in the sleeve in response to pressure changes in the duct, a damper in the duct, a motor for actuating the damper, a room thermostat and an electrical control actuated by movement of the disc and thermostat, for actuating the motor for opening movement of said damper when the disc is in one position and the room thermostat calls for operation of the controlled equipment, and for controlling the damper in various open positions thereafter, depending on movement of the disc to other positions.

WILLIAM W. STUART.